(12) United States Patent
Yanagida et al.

(10) Patent No.: US 12,043,754 B2
(45) Date of Patent: Jul. 23, 2024

(54) TWO-COMPONENT TYPE CURABLE RESIN COMPOSITION, PRODUCT, DRY FILM, CURED PRODUCT, AND PRINTED WIRING BOARD

(71) Applicant: TAIYO HOLDINGS CO., LTD., Saitama-ken (JP)

(72) Inventors: Nobuyuki Yanagida, Saitama-ken (JP); Kenichi Shirakawa, Saitama-ken (JP); Kazuya Kitamura, Saitama-ken (JP); Yasuaki Arai, Saitama-ken (JP)

(73) Assignee: TAIYO HOLDINGS CO., LTD., Hiki-gun (JP)

( * ) Notice: Subject to any disclaimer, the term of this patent is extended or adjusted under 35 U.S.C. 154(b) by 0 days.

(21) Appl. No.: 17/709,494

(22) Filed: Mar. 31, 2022

(65) Prior Publication Data

US 2022/0325128 A1    Oct. 13, 2022

(30) Foreign Application Priority Data

Mar. 31, 2021    (JP) .................................. 2021-061821

(51) Int. Cl.
*C09D 151/08*    (2006.01)

(52) U.S. Cl.
CPC .................................. *C09D 151/08* (2013.01)

(58) Field of Classification Search
CPC ............... C09D 151/08; C08F 290/064; C08F 290/144; G03F 7/004; G03F 7/038; G03F 7/0385; H05K 3/287; H05K 1/0313; C08L 63/00; C08L 33/00; C08J 7/0427
See application file for complete search history.

(56) References Cited

U.S. PATENT DOCUMENTS

| | | | |
|---|---|---|---|
| 2008/0096115 A1 | 4/2008 | Tanabe et al. | |
| 2013/0189624 A1* | 7/2013 | Koda ................ | C08G 59/4269 430/280.1 |
| 2021/0198537 A1* | 7/2021 | Mayer ................ | C08G 59/226 |

FOREIGN PATENT DOCUMENTS

| | | | |
|---|---|---|---|
| JP | 2003277480 | * | 10/2003 |
| JP | 2004264560 A | | 9/2004 |
| JP | 2004359639 A | | 12/2004 |
| JP | 2005097141 A | | 4/2005 |
| JP | 2005220097 A | | 8/2005 |
| JP | 2006160634 A | | 6/2006 |
| JP | 2008094770 A | | 4/2008 |
| JP | 2008509967 A | | 4/2008 |
| JP | 2009040762 A | | 2/2009 |
| JP | 2011080036 A | | 4/2011 |
| WO | WO-2004048434 A1 | | 6/2004 |
| WO | WO-2006059458 A1 | | 6/2006 |
| WO | WO-2009019173 A1 | | 2/2009 |

* cited by examiner

*Primary Examiner* — Robert S Jones, Jr.
*Assistant Examiner* — Jiangtian Xu
(74) *Attorney, Agent, or Firm* — Element IP, PLC

(57) ABSTRACT

[Problem] Provided is a two-component type curable resin composition that allows a mixture of an A agent and a B agent to have excellent dispersibility and printability, causes no visible-copper phenomenon, and provides an excellent packing form (receivability) for transportation.

[Solution] A two-component type curable resin composition according to the present invention is characterized by including: an A agent containing a carboxyl group-containing resin; and a B agent containing a thermosetting ingredient,
  wherein the A agent has a viscosity value in the range of 50 dPa·s or more and 200 dPa·s or less at 25° C. at 5 rpm,
  wherein the B agent has a viscosity value in the range of 100 dPa·s or more and 300 dPa·s or less at 25° C. at 5 rpm,
  wherein the dispersity of a mixture of the A agent and the B agent is 20 μm or less on a grind gauge, and
  wherein, with respect to the total amount of the A agent and the B agent, the mixing ratio of the A agent is 75 mass % or more and less than 100 mass %, and the mixing ratio of the B agent is more than 0 mass % and 25 mass % or less.

17 Claims, No Drawings

TWO-COMPONENT TYPE CURABLE RESIN COMPOSITION, PRODUCT, DRY FILM, CURED PRODUCT, AND PRINTED WIRING BOARD

BACKGROUND OF THE INVENTION

Field of the Invention

The present invention relates to a two-component type curable resin composition. The present invention also relates to a product composed of the two-component type curable resin composition packed in a container. Furthermore, the present invention relates to a dry film, a cured product, and a printed wiring board that are each produced with the two-component type curable resin composition.

Background Art

From a viewpoint of achieving higher precision and higher density, a solder resist to be used for most printed wiring boards is currently a liquid alkali development type of solder resist (a curable resin composition) that forms an image through exposure followed by development, and is heat-cured to form a coating. As such a curable resin composition, a two-component type is attracting a higher degree of attention than a one-component type from a viewpoint of storage stability. One suggestion is that such a composition is made to be at least a two-component system, for example, a photo-curable/thermosetting resin composition containing a carboxyl group-containing resin, a reactive diluent, and an epoxy compound, wherein the epoxy resin is blended in a composition other than a composition having at least the carboxyl group-containing resin and the reactive diluent blended therein (see Patent Literature 1).

When such a two-component type curable resin composition as above-mentioned is used, the two components are mixed before use. An adjustment of the viscosity of the mixture of the components is made by an ink supplier before shipment. In recent years, the film thickness of such a coating has been becoming thinner from a viewpoint of improving the yield when parts are packaged (for example, Patent Literature 2). In recent years, such a thin film has been further desired to undergo strict film thickness control.

However, a two-component type curable resin composition has a plurality of ingredients mixed therein to satisfy various characteristic requirements, and thus, any insufficient mixing of the ingredients can cause the two-component type curable resin composition to have an imbalance in concentration. Accordingly, a coating of a two-component type curable resin composition applied to a base material or the like can result in having an uneven film thickness before being dried. In particular, when made a thin film, such a coating can cause, for example, a problem of poor appearance due to "visible copper", that is, a problem in that the metal (copper) wires on the substrate on the underside of the coating become unevenly visible through the coating.

CITATION LIST

Patent Literature

Patent Literature 1: International Publication No. WO2004/048434
Patent Literature 2: Japanese Patent Application Laid-Open Publication No. 2004-264560

SUMMARY OF THE INVENTION

Technical Problem

For a two-component type curable resin composition, two components, that is, an A agent containing a carboxyl group-containing resin and a B agent containing a thermosetting ingredient, are often used. In cases where such a two-component type curable resin composition is cured, a cross-linking reaction between the carboxyl group-containing resin and the thermosetting ingredient enhances the cross-linking density, and thus enhances the uniformity and density of the cured coating, thus making it possible to obtain a solder resist effect, and to inhibit a visible-copper phenomenon. However, in cases where at least one of the A agent and the B agent has poor dispersibility, the dispersibility of a mixture of the A agent and the B agent is poor in some cases. This undesirably results in causing a visible-copper phenomenon. In view of this, one example of contrivance for enhancing the dispersibility of both the A agent and the B agent is bead mill dispersion. Bead mill dispersion involves making the viscosity lower. However, in cases where the A agent and the B agent are both made to have low viscosity, the viscosity of the mixture of the agents tends to become too low, and be unsuitable for screen printing. In addition, in cases where the B agent contains a filler and has a high viscosity, the viscosity of the mixture of the agents can be made suitable for screen printing, but the poor dispersibility of the B agent still leaves some room for improvement in the dispersibility of the mixture of the agents. On the other hand, a two-component type curable resin composition is transported with the base compound and the curing agent packed in separate containers, and thus, involves use of a large packing form, posing a problem of a transportation cost increase, and leaving room for improvement.

Accordingly, an object of the present invention is to provide a two-component type curable resin composition that allows a mixture of an A agent and a B agent to have excellent dispersibility and printability, causes no visible-copper phenomenon, and provides an excellent packing form (receivability) for transportation. Another object of the present invention is to provide a dry film having a resin layer composed of the dried coating of the resin composition, a cured product of the resin composition or the resin layer of the dry film, and a printed wiring board having the cured product.

Solution to Problem

The present inventors have made studies vigorously, and consequently have come to completed the present invention through the discovery that adjusting the viscosity range for an A agent and a B agent in a two-component type curable resin composition, and in addition, the mixing ratios of the A agent and the B agent makes it possible to obtain the two-component type curable resin composition that allows a mixture of the A agent and the B agent to have excellent dispersibility and printability, causes no visible-copper phenomenon, provides a small packing form, and thus makes it possible to control the transportation cost. It is to be noted that a mixture of agents in this DESCRIPTION means that the agents have been mixed and stirred.

That is, a two-component type curable resin composition according to the present invention is characterized by including: an A agent containing a carboxyl group-containing resin; and a B agent containing a thermosetting ingredient, wherein the A agent has a viscosity value in the range of 50 dPa·s or more and 200 dPa·s or less at 25° C. at 5 rpm, wherein the B agent has a viscosity value in the range of 100 dPa·s or more and 300 dPa·s or less at 25° C. at 5 rpm, wherein the dispersity of a mixture of the A agent and the B agent is 20 μm or less on a grind gauge, and wherein, with respect to the total amount of the A agent and the B agent, the mixing ratio of the A agent is 75 mass % or more and less than 100 mass %, and the mixing ratio of the B agent is more than 0 mass % and 25 mass % or less.

In an aspect of the present invention, the viscosity value of a mixture of the A agent and the B agent is preferably in the range of 30 dPa·s or more and 200 dPa·s or less at 25° C. at 5 rpm.

In an aspect of the present invention, it is preferable that the B agent has a higher viscosity than the A agent, and that a difference between the viscosity value of the A agent at 25° C. at 5 rpm and the viscosity value of the B agent at 25° C. at 5 rpm is in the range of more than 0 dPa·s and 250 dPa·s or less.

In an aspect of the present invention, the thermosetting ingredient preferably contains a polyfunctional epoxy compound.

A product according to another aspect of the present invention is characterized in that the A agent and the B agent for the two-component type curable resin composition are packed in separate containers, and that at least one of the A agent and the B agent is packed in a bag.

A dry film according to another aspect of the present invention is characterized by including: a first film; and a resin layer composed of a dried coating of the two-component type curable resin composition and formed on the first film.

A cured product according to another aspect of the present invention is characterized by being obtained by curing the two-component type curable resin composition or the resin layer of the dry film.

A printed wiring board according to another aspect of the present invention is characterized by including the cured product.

Advantageous Effects of Invention

The present invention makes it possible to provide a two-component type curable resin composition that allows a mixture of an A agent and a B agent to have excellent dispersibility and printability, causes no visible-copper phenomenon, and provides an excellent packing form (receivability) for transportation. In addition, the present invention makes it possible to provide a dry film having a resin layer composed of the dried coating of the resin composition, a cured product of the resin composition or the resin layer of the dry film, and a printed wiring board having the cured product.

DETAILED DESCRIPTION OF THE INVENTION

[Two-Component Type Curable Resin Composition]

A two-component type curable resin composition according to the present invention is composed of an A agent and a B agent. The A agent contains at least a carboxyl group-containing resin, has only to satisfy the below-mentioned viscosity, and may further contain a photopolymerizable monomer, photoinitiator, sensitizer, heat-curing catalyst, extender pigment, colorant, or the like. In addition, the B agent contains at least a thermosetting ingredient, has only to satisfy the below-mentioned viscosity, and may further contain an organic solvent, photopolymerizable monomer, photoinitiator, heat-curing catalyst, extender pigment, or the like.

The viscosity value of the A agent at 25° C. at 5 rpm is in the range of 50 dPa·s or more and 200 dPa·s or less, preferably in the range of 70 dPa·s or more and 150 dPa·s or less, more preferably in the range of 100 dPa·s or more and 120 dPa·s or less. The A agent having a viscosity value in these value ranges at 25° C. at 5 at rpm makes it possible to enhance the dispersibility, and consequently to form a coating that causes no visible-copper phenomenon.

The viscosity value of the B agent at 25° C. at 5 rpm is in the range of 100 dPa·s or more and 300 dPa·s or less, preferably in the range of 150 dPa·s or more and 300 dPa·s or less, more preferably in the range of 200 dPa·s or more and 300 dPa·s or less. The B agent having a viscosity value in these value ranges at 25° C. at 5 at rpm makes it possible to enhance the dispersibility, and consequently to form a coating that causes no visible-copper phenomenon.

In the present invention, the viscosity is a viscosity value measured in accordance with JIS-Z8803: 2011, specifically the "Viscosity measurement method using a cone-plate rotational viscometer" in JIS-Z8803:2011, Part 10, using a cone-plate rotational viscometer (a cone-plate type) (TVE-33H, manufactured by Toki Sangyo Co., Ltd.; a rotor at 3°×R 9.7) under conditions at 25° C. at a rotor rotational speed of 5.0 rpm for 30 seconds.

With respect to the total amount of the A agent and the B agent, the mixing ratio of the A agent is 75 mass % or more and less than 100 mass %, preferably 77 mass % or more and 97 mass % or less, more preferably 80 mass % or more and 95 mass % or less, and the mixing ratio of the B agent is more than 0 mass % and 25 mass % or less, preferably 3 mass % or more and 23 mass % or less, preferably 5 mass % or more and 20 mass % or less.

The viscosity value of a mixture of the A agent and the B agent, at 25° C. at 5 rpm, is preferably in the range of 30 dPa·s or more and 200 dPa·s or less, more preferably in the range of 60 dPa·s or more and 160 dPa·s or less, still more preferably in the range of 90 dPa·s or more and 130 dPa·s or less.

Allowing the mixing ratios of the A agent and the B agent to be in the above-mentioned ranges leads to decreasing the volume ratio of the B agent, and consequently enhancing the packability.

The dispersity of a mixture of the A agent and the B agent is 20 μm or less, preferably 15 μm or less, more preferably 10 μm or less, on a grind gauge. The dispersity being equal to or smaller than these value ranges makes it possible to form a coating that causes no visible-copper phenomenon in screen printing in particular.

The dispersity on a grind gauge in the present invention is defined as a dispersity measured by a particle form method in accordance with JIS K 5600-2-5:1999 using a grind gauge having a width of 90 mm, a length of 240 mm, and the largest depth of 50 μm. The particle form method is specifically as below-mentioned. That is, a point where a product (measurement sample) first shows a predominantly speckled (speck-like) appearance is observed. In particular, a point containing 5 to 10 particles in a 3-mm-wide band across a groove is observed. Specks that appear scatteredly before the point where the predominantly speckled appearance is first shown are disregarded.

For a two-component type curable resin composition according to the present invention, it is preferable that the B agent has a higher viscosity value at 25° C. at 5 rpm than the A agent, and that a difference in the viscosity value at 25° C. at 5 rpm between the A agent and the B agent is in the range of more than 0 dPa·s and 250 dPa·s or less. The B agent having a higher viscosity makes it less likely to generate drippings during packing, and provides excellent workability and productivity. The viscosity is more preferably in the range of more than 0 dPa·s and 200 dPa·s or less, still more preferably in the range of more than 0 dPa·s and 150 dPa·s or less.

[Product]

A two-component type curable resin composition according to the present invention is provided in the form of a product composed of the A agent and the B agent that are packed in separate containers. The A agent and the B agent are each preferably packed in a container such as a bag, aluminum foil-made container, packaging wrap film-made container, or syringe from viewpoints of environmental protection and a packing form (receivability) for transportation. The B agent having a higher viscosity is more preferably packed in a bag among these. A preferable bag is a pouch. Examples of materials include: synthetic resins such as polypropylene for the packing side and polyesters (PET) for the external side; materials made of a film formed by laminating an aluminum foil; and the like.

Furthermore, in cases where a bag is used as a container of the A agent or the B agent, increasing the occupancy ratio of the A agent or the B agent to the bag is preferable from a viewpoint of making it possible to provide a two-component type curable resin composition having further excellent packability. Such a bag is more preferably smaller. The occupancy ratio of the A agent or the B agent is preferably 50 to 100 volume %.

Below, each of the ingredients constituting the A agent and the B agent of a two-component type curable resin composition according to the present invention will be described.

[Ingredient Constituting A Agent]
[Carboxyl Group-Containing Resin]

A carboxyl group-containing resin that can be used is any kind of conventionally known resin having a carboxyl group in the molecule. Allowing a two-component type curable resin composition to contain a carboxyl group-containing resin makes it possible to afford alkali developability to the two-component type curable resin composition. In particular, a carboxyl group-containing photosensitive resin having an ethylenically unsaturated double bond in the molecule is preferable from viewpoints of photo-curability and development resistance. As the ethylenically unsaturated double bond, preferred is one derived from acrylic acid or methacrylic acid or a derivative thereof. In cases where only a carboxyl group-containing resin having no ethylenically unsaturated double bond is used, making the composition photo-curable involves using, in combination, the below-mentioned compound having a plurality of ethylenically unsaturated groups in the molecule, that is, a photopolymerizable monomer. Specific examples of the carboxyl group-containing resin include such compounds as below-mentioned (may be either oligomers or polymers).

(1) A carboxyl group-containing resin obtained by copolymerization of an unsaturated carboxylic acid such as (meth)acrylic acid with an unsaturated group-containing compound such as styrene, α-methylstyrene, lower alkyl (meth)acrylate, or isobuthylene.

(2) A carboxyl group-containing urethane resin obtained by a polyaddition reaction of a diisocyanate such as an aliphatic diisocyanate, branched aliphatic diisocyanate, alicyclic diisocyanate, or aromatic diisocyanate with a carboxyl group-containing dialcohol compound such as dimethylol propionic acid or dimethylol butanoic acid and a diol compound such as polycarbonate polyol, polyether polyol, polyester polyol, polyolefin polyol, acrylic polyol, bisphenol A alkylene oxide adduct diol, or a compound having a phenolic hydroxyl group and an alcoholic hydroxyl group.

(3) A carboxyl group-containing photosensitive urethane resin obtained by a polyaddition reaction of the following: a diisocyanate; a (meth)acrylate or a partial acid anhydride-modified product of a bifunctional epoxy resin such as a bisphenol A-type epoxy resin, hydrogenated bisphenol A-type epoxy resin, bisphenol F-type epoxy resin, bisphenol S-type epoxy resin, bixylenol-type epoxy resin, or biphenol-type epoxy resin; a carboxyl group-containing dialcohol compound; and a diol compound.

(4) A carboxyl group-containing photosensitive urethane resin obtained by adding a compound having one hydroxyl group and one or more (meth)acryloyl groups in the molecule such as hydroxyalkyl (meth)acrylate during synthesis of a resin in the above-mentioned (2) or (3) to be terminally (meth)acrylated.

(5) A carboxyl group-containing photosensitive urethane resin obtained by adding a compound having one isocyanate group and one or more (meth)acryloyl groups in the molecule such as equimolar reaction product of isophorone diisocyanate and pentaerythritol triacrylate during synthesis of a resin in the above-mentioned (2) or (3) to be terminally (meth)acrylated.

(6) A carboxyl group-containing photosensitive resin obtained by bringing a bifunctional (solid) epoxy resin or a (solid) epoxy resin with three or more functionalities into reaction with (meth)acrylic acid and adding a dibasic acid anhydride to the hydroxyl group present in a side chain.

(7) A carboxyl group-containing photosensitive resin obtained by bringing a polyfunctional epoxy resin into reaction with (meth)acrylic acid and adding a dibasic acid anhydride to the generated hydroxyl group, which multifunctional epoxy resin is obtained by epoxidation of a hydroxyl group of bifunctional (solid) epoxy resin with epichlorohydrin.

(8) A carboxyl group-containing polyester resin obtained by bringing a bifunctional oxetane resin into reaction with a dicarboxylic acid such as adipic acid, phthalic acid, or hexahydrophthalic acid and adding a dibasic acid anhydride such as phthalic anhydride, tetrahydrophthalic anhydride, or hexahydrophthalic anhydride to the primary hydroxyl group generated.

(9) A carboxyl group-containing photosensitive resin obtained by bringing an epoxy compound having a plurality of epoxy groups in one molecule into reaction with a compound having at least one alcoholic hydroxyl group and one phenolic hydroxyl group in one molecule, such as p-hydroxyphenethyl alcohol, and an unsaturated group-containing monocarboxylic acid such as (meth)acrylic acid, and bringing the alcoholic hydroxyl group of the obtained reaction product into reaction with a polybasic anhydride such as maleic anhydride, tetrahydrophthalic anhydride, trimellitic anhydride, pyromellitic anhydride, or adipic acid.

(10) A carboxyl group-containing photosensitive resin obtained by bringing a compound having a plurality of phenolic hydroxyl groups in one molecule into reaction with an alkylene oxide such as ethylene oxide or propylene oxide; bringing the obtained reaction product into reaction with an unsaturated group-containing monocarboxylic acid; and bringing the obtained reaction product into reaction with a polybasic anhydride.

(11) A carboxyl group-containing photosensitive resin obtained by bringing a compound having a plurality of phenolic hydroxyl groups in one molecule into reaction with a cyclic carbonate compound such as ethylene carbonate or propylene carbonate; bringing the obtained reaction product into reaction with an unsaturated group-containing monocarboxylic acid; and bringing the obtained reaction product into reaction with a polybasic anhydride.

(12) A carboxyl group-containing photosensitive resin obtained by further adding a compound having one epoxy group and one or more (meth)acryloyl groups in one molecule to a resin in the above-mentioned (1) to (11).

It is to be noted that the term (meth)acrylate, when used herein, is a generic term of an acrylate, a methacrylate, and a mixture thereof; and the same is applied to other similar expressions.

A carboxyl group-containing resin that can be used in the present invention is not limited to the materials enumerated above. In addition, the carboxyl group-containing resins enumerated above may be used singly or in mixture of a plurality of kinds thereof.

In the present invention, such a carboxyl group-containing resin has an acid value preferably in the range of from 30 to 150 mgKOH/g, more preferably in the range of from 50 to 120 mgKOH/g, considering the developability in use of a weak alkali developing solution such as an aqueous sodium carbonate solution, and considering the lithographic quality of a resist pattern. A carboxyl group-containing resin having a higher acid value enhances the developability accordingly, but urges the developing solution to dissolve the exposed portion, and thus, in some cases, the exposed portion and the unexposed portion are dissolved and peeled undistinguishably by the developing solution.

The weight average molecular weight of the carboxyl group-containing resin varies depending on the resin backbone, and is generally in the range of from 2,000 to 150,000, preferably in the range of from 3,000 to 100,000. Using a carboxyl group-containing resin having a weight average molecular weight of 2,000 or more makes it possible to enhance the resolution and tack-free performance. In addition, using a carboxyl group-containing resin having a weight average molecular weight of 150,000 or less makes it possible to enhance the developability and preservation stability. The weight average molecular weight can be measured by gel permeation chromatography (GPC).

The content ratio of a carboxyl group-containing resin in the A agent can be set suitably in accordance with the viscosity of the A agent of interest. The content ratio of a carboxyl group-containing resin in the A agent is preferably 20 to 80 mass % in the total amount of the A agent, more preferably 25 to 75 mass %, in terms of the solid concentration.

[Ingredient Constituting B Agent]
[Thermosetting Ingredient]

A thermosetting ingredient that can be used is any known thermosetting ingredient. A two-component type curable resin composition containing a thermosetting ingredient makes it possible to enhance the heat resistance of the cured coating. Examples of thermosetting ingredients that can be used include known thermosetting ingredients such as: amino resins such as melamine resins, benzoguanamine resins, melamine derivatives, and benzoguanamine derivatives; isocyanate compounds; blocked isocyanate compounds; cyclocarbonate compounds; epoxy compounds; oxetane compounds; episulfide resins; bismaleimide; and carbodiimide resins. A particularly preferred thermosetting ingredient is a thermosetting ingredient having a plurality of cyclic ether groups or cyclic thioether groups (hereinafter referred to as cyclic (thio)ether groups for short) in the molecule. The thermosetting ingredients can be used singly or in combination of two or more kinds thereof.

The thermosetting ingredient having a plurality of cyclic (thio)ether groups in the molecule is a compound having a plurality of 3-, 4-, or 5-membered cyclic (thio)ether groups in the molecule; and examples of thereof include a compound having a plurality of epoxy groups in the molecule, that is, a polyfunctional epoxy compound; a compound having a plurality of oxetanyl groups in the molecule, that is, a polyfunctional oxetane compound; and a compound having a plurality of thioether groups in the molecule, that is, an episulfide resin. In particular, a polyfunctional epoxy compound is preferable.

Examples of such polyfunctional epoxy compounds include bisphenol A-type epoxy resins, bisphenol F-type epoxy resins, hydrogenated bisphenol A-type epoxy resins, brominated bisphenol A-type epoxy resins, bisphenol S-type epoxy resins, phenol novolak-type epoxy resins, cresol novolak-type epoxy resins, bisphenol A novolak-type epoxy resins, biphenyl-type epoxy resins, naphthalene epoxy resins, dicyclopentadiene-type epoxy resins, triphenylmethane-type epoxy resins, and the like.

Examples of commercially available epoxy resins include: jER 828, 806, 807, YX8000, YX8034, and 834 manufactured by Mitsubishi Chemical Corporation; YD-128, YDF-170, ZX-1059, and ST-3000 manufactured by Nippon Steel Chemical & Material Co., Ltd.; EPICLON 830, 835, 840, 850, N-730A, and N-695 manufactured by DIC Corporation; and RE-306 manufactured by Nippon Kayaku Co., Ltd.; and the like.

Examples of the polyfunctional oxetane compound include polyfunctional oxetanes such as bis[(3-methyl-3-oxetanylmethoxy)methyl]ether, bis[(3-ethyl-3-oxetanylmethoxy)methyl]ether, 1,4-bis[(3-methyl-3-oxetanylmethoxy)methyl]benzene, 1,4-bis[(3-ethyl-3-oxetanylmethoxy)methyl]benzene, (3-methyl-3-oxetanyl)methylacrylate, (3-ethyl-3-oxetanyl)methylacrylate, (3-methyl-3-oxetanyl)methylmethacrylate, (3-ethyl-3-oxetanyl)methylmethacrylate, and an oligomer or a copolymer thereof; and, in addition to those, examples include an etherification product of oxetanealcohol with a resin having a hydroxyl group such as novolak resin, poly(p-hydroxy styrene), cardo-type bisphenols, calixarenes, calixresorcinarenes, or silsesquioxane. Besides, examples include a copolymer of an unsaturated monomer having an oxetane ring and alkyl (meth)acrylate.

Examples of compounds having a plurality of cyclic thioether groups in the molecule include bisphenol A-type episulfide resins and the like. In addition, an episulfide resin obtained by replacing an oxygen atom of the epoxy group of novolak-type epoxy resin with a sulfur atom using the same synthesis method can be used as well.

Examples of amino resins such as melamine derivatives and benzoguanamine derivatives include a methylol melamine compound, a methylol benzoguanamine compound, a methylol glycoluril compound, a methylolurea compound, and the like.

As the isocyanate compound, a polyisocyanate compound can be blended in. Examples of polyisocyanate compounds include: aromatic polyisocyanates such as 4,4'-diphenylmethane diisocyanate, 2,4-tolylene diisocyanate, 2,6-tolylene diisocyanate, naphthalene-1,5-diisocyanate, o-xylylene diisocyanate, m-xylylene diisocyanate, and 2,4-tolylene dimer; aliphatic polyisocyanates such as tetramethylene diisocyanate, hexamethylene diisocyanate, methylene diisocyanate, trimethylhexa methylene diisocyanate, 4,4-methylene bis(cyclohexyl isocyanate), and isophorone diisocyanate; alicyclic polyisocyanates such as bicycloheptane triisocyanate; and adducts, biurets, and isocyanurates of the above-mentioned isocyanate compounds; and the like.

As the blocked isocyanate compound, an addition reaction product of the isocyanate compound and the isocyanate blocking agent can be used. Examples of isocyanate compounds that can react with an isocyanate blocking agent include the above-mentioned polyisocyanate compound and the like. Examples of isocyanate blocking agents include: phenol-based blocking agents; lactam-based blocking agents; activated methylene-based blocking agents; alcohol-based blocking agents; oxime-based blocking agents; mercaptan-based blocking agents; acid amide-based blocking agents; imide-based blocking agents; amine-based blocking agents; imidazole-based blocking agents; imine-based blocking agents; and the like.

The content ratio of a thermosetting ingredient in the B agent can be set suitably in accordance with the viscosity of the B agent of interest. The content ratio of a thermosetting ingredient in the B agent is preferably 20 to 100 mass % in the total amount of the B agent, more preferably 25 to 100 mass %, in terms of the solid concentration.

[Ingredient that May be Contained in at Least One of a Agent and B Agent]

[Photoinitiator]

A photoinitiator is used to allow a carboxyl group-containing resin or a photopolymerizable monomer to react through exposure. A photoinitiator that can be used is any known photoinitiator. Such photoinitiators may be used singly or in combination of two or more kinds thereof.

Specific examples of photoinitiators include: bisacylphosphine oxides such as bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-propylphenylphosphine oxide, bis-(2,6-dichlorobenzoyl)-1-naphthylphosphine oxide, bis-(2,6-dimethoxybenzoyl) phenylphosphine oxide, bis-(2,6-dimethoxybenzoyl)-2,4,4-trimethyl pentylphosphine oxide, bis-(2,6-dimethoxybenzoyl)-2,5-dimethyl phenylphosphine oxide, and bis-(2,4,6-trimethylbenzoyl)-phenylphosphine oxide; monoacylphosphine oxides such as 2,6-dimethoxybenzoyl-diphenylphosphine oxide, 2,6-dichlorobenzoyldiphenylphosphine oxide, methyl 2,4,6-trimethylbenzoylphenylphosphinate ester, 2-methylbenzoyldiphenylphosphine oxide, isopropyl pivaloylphenylphosphinate ester, and 2,4,6-trimethylbenzoyldiphenylphosphine oxide; hydroxyacetophenones such as ethyl phenyl(2,4,6-trimethylbenzoyl) phosphinate, 1-hydroxy-cyclohexylphenyl ketone, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, and 2-hydroxy-2-methyl-1-phenyl propane-1-one; benzoins such as benzoin, benzyl, benzoin methyl ether, benzoin ethyl ether, benzoin n-propyl ether, benzoin isopropyl ether, and benzoin n-butyl ether; benzoin alkyl ethers; benzophenones such as benzophenone, p-methylbenzophenone, Michler's ketone, methylbenzophenone, 4,4'-d ichlorobenzophenone, and 4,4'-bis-diethylaminobenzophenone; acetophenones such as acetophenone, 2,2-dimethoxy-2-phenylacetophenone, 2,2-diethoxy-2-phenylacetophenone, 1,1-dichloroacetophenone, 1-hydroxycyclohexylphenyl ketone, 2-methyl-1-[4-(methylthio)phenyl]-2-morpholino-1-propanone, 2-benzyl-2-dimethylamino-1-(4-morpholino phenyl)-butanone-1, 2-(dimethylamino)-2-[(4-methylphenyl)methyl)-1-[4-(4-morpholinyl)phenyl]-1-butanone, and N,N-dimethylaminoacetophenone; thioxanthones such as thioxanthone, 2-ethylthioxanthone, 2-isopropylthioxanthone, 2,4-dimethylthioxanthone, 2,4-diethylthioxanthone, 2-chlorothioxanthone, and 2,4-diisopropylthioxanthone; anthraquinones such as anthraquinone, chloroanthraquinone, 2-methylanthraquinone, 2-ethylanthraquinone, 2-tert-butylanthraquinone, 1-chloroanthraquinone, 2-amylanthraquinone, and 2-aminoanthraquinone; ketals such as acetophenone dimethylketal and benzyldimethylketal; benzoate esters such as ethyl-4-dimethylaminobenzoate, 2-(dimethylamino)ethyl benzoate, and ethyl p-dimethylbenzoate ester; oxime esters such as 1,2-octanedione,1-[4-(phenylthio)-,2-(O-benzoyloxime)] and ethanone,1-[9-ethyl-6-(2-methylbenzoyl)-9H-carbazole-3-yl]-4-(O-acetyl oxime); titanocenes such as bis(η5-2,4-cyclopentadiene-1-yl)-bis(2,6-difluoro-3-(1H-pyrrole-1-yl)phenyl)titanium and bis(cyclopentadienyl)-bis[2,6-difluoro-3-(2-(1-pyl-1-yl)ethyl) phenyl]titanium; phenyldisulfide 2-nitro fluorene; butyroin; anisoin ethyl ether; azobisisobutyronitrile; tetramethylthiuram disulfide; and the like.

Examples of commercially available products of an α-amino acetophenone-based photoinitiator include Omnirad 907, 369, 369E, and 379 manufactured by IGM Resins B.V., and the like. In addition, examples of commercially available products of an acylphosphine oxide-based photoinitiator include Omnirad TPO H and 819 manufactured by IGM Resins B.V., and the like. Examples of commercially available products of an oxime ester-based photoinitiator include: Irgacure OXE01 and OXE02 manufactured by BASF Japan Ltd.; N-1919, ADEKA ARKLS NCI-831 and NCI-831E manufactured by ADEKA Corporation; TR-PBG-304 manufactured by Changzhou Tronly New Electronic Materials Co., Ltd.; and the like.

Besides, examples include carbazole oxime ester compounds described in Japanese Patent Application Laid-Open Publication No. 2004-359639, Japanese Patent Application Laid-Open Publication No. 2005-097141, Japanese Patent Application Laid-Open Publication No. 2005-220097, Japanese Patent Application Laid-Open Publication No. 2006-160634, Japanese Patent Application Laid-Open Publication No. 2008-094770, Japanese Translated PCT Patent Application Laid-Open No. 2008-509967, Japanese Translated PCT Patent Application Laid-open No. 2009-040762, and Japanese Patent Application Laid-Open Publication No. 2011-80036.

The content ratio of a photoinitiator in the A agent can be set suitably in accordance with the viscosity of the A agent of interest. In cases where the A agent contains a photoinitiator, the content ratio of the photoinitiator is preferably more than 0 mass % and 20 mass % or less in the total amount of the A agent, more preferably 0.5 to 10 mass %, in terms of the solid concentration.

Additionally, in cases where the B agent contains a photoinitiator, the content ratio of the photoinitiator can be set suitably in accordance with the viscosity of the B agent of interest. The content ratio of a photoinitiator in the B agent is preferably more than 0 mass % and 20 mass % or less in the total amount of the B agent, more preferably 0.5 to 10 mass %, in terms of the solid concentration.

Furthermore, in cases where a two-component type curable resin composition contains a photoinitiator, the content ratio of the photoinitiator is preferably more than 0 mass % and 20 mass % or less in the total amount of the composition, more preferably 0.5 to 10 mass %, in terms of the solid concentration. In cases where the content ratio of the photoinitiator in the two-component type curable resin composition is more than 0 mass %, the photo-curability of the two-component type curable resin composition is favorable, and the coating characteristics such as chemical resistance is also favorable. On the other hand, in cases where the content ratio is 20 mass % or less, the photoabsorption at the surface of a resist film (cured coating) is favorable, and the curability in the deep portions is less likely to decrease.

In combination with the above photoinitiator, a photoinitiation auxiliary agent or a sensitizer may be used. Examples of the photoinitiation auxiliary agent or the sensitizer include a benzoin compound, an anthraquinone compound, a thioxanthone compound, a ketal compound, a benzophenone compound, a tertiary amine compound, and a xanthone compound. In particular, a thioxanthone compound such as 2,4-dimethyl thioxanthone, 2,4-diethyl thioxanthone, 2-chlorothioxanthone, 2-isopropyl thioxanthone, or 4-isopropyl thioxanthone is preferably used. Containing such a thioxanthone compound makes it possible to enhance the curability in the deep portions. These compounds may be used as the photoinitiator in some cases, but are preferably used in combination with the photoinitiator. Further, the photoinitiation auxiliary agents or the sensitizers may be used singly or in combination of two or more kinds thereof.

It is to be noted that, because these photoinitiator, photoinitiation auxiliary agent, and sensitizer absorb a specific wavelength, there are some cases in which they have lower sensitivity and function as ultraviolet absorbents. Yet, these are not used only for the purpose of improving the sensitivity of the resin composition. Light having a specific wavelength is absorbed as necessary, and thereby, the photoreactivity of the surface can be increased. Thus, the line shape and opening of the resist pattern can be changed to a vertical shape, a tapered shape, or a reversed tapered shape. Besides, the accuracy of the width of the line and the accuracy of the diameter of the opening can be improved.

[Photopolymerizable Monomer]

A two-component type curable resin composition according to the present invention can have a photopolymerizable monomer blended therein. The photopolymerizable monomer is a monomer having an ethylenically unsaturated double bond. Examples of such photopolymerizable monomers include: alkyl(meth)acrylates such as 2-ethylhexyl (meth)acrylate and cyclohexyl(meth)acrylate; hydroxyalkyl (meth)acrylates such as 2-hydroxyethyl(meth)acrylate and 2-hydroxypropyl(meth)acrylate; mono- or di-(meth)acrylates of alkylene oxide derivatives such as ethylene glycol, propylene glycol, diethylene glycol, and dipropylene glycol; poly(meth)acrylates of the following: polyalcohols such as hexane diol, trimethylol propane, pentaerythritol, ditrimethylol propane, dipentaerythritol, and trishydroxyethylisocyanurate; or ethylene oxide or propylene oxide adducts of such polyalcohols; (meth)acrylates of ethylene oxide or propylene oxide adducts of phenols, such as phenoxyethyl (meth)acrylate and polyethoxy di(meth)acrylate of bisphenol A; (meth)acrylates of glycidyl ethers such as glycerin diglycidyl ether, trimethylolpropane triglycidyl ether, and triglycidyl isocyanurate; and melamine(meth)acrylate. The photopolymerizable monomers may be used singly or in combination of two or more kinds thereof.

The content ratio of a photopolymerizable monomer in the A agent can be set suitably in accordance with the viscosity of the A agent of interest. In cases where the A agent contains a photopolymerizable monomer, the content ratio of the photopolymerizable monomer is preferably more than 0 to 30 mass % in the total amount of the A agent, more preferably 5 to 20 mass %, in terms of the solid concentration.

Additionally, in cases where the B agent contains a photopolymerizable monomer, the content ratio of the photopolymerizable monomer can be set suitably in accordance with the viscosity of the B agent of interest. In cases where the B agent contains a photopolymerizable monomer, the content ratio of the photopolymerizable monomer is preferably more than 0 mass % and 30 mass % or less in the total amount of the composition, more preferably 5 to 20 mass %, in terms of the solid concentration.

Furthermore, in cases where the two-component type curable resin composition contains a photopolymerizable monomer, the content ratio of the photopolymerizable monomer is preferably more than 0 mass % and 30 mass % or less in the total amount of the composition, more preferably 5 to 20 mass %, in terms of the solid concentration. In cases where the content ratio of a photopolymerizable monomer in the two-component type curable resin composition is more than 0 mass %, the photo-curability is favorable, and the pattern formation is easier in alkali development after active energy ray irradiation. Additionally, in cases where the content ratio is 30 mass % or less, halation is less likely to occur, and favorable resolution is obtained.

[Heat-Curing Catalyst]

A two-component type curable resin composition according to the present invention can have a heat-curing catalyst blended therein. Examples of such a heat-curing catalyst include imidazole, imidazole derivatives such as 2-methylimidazole, 2-ethylimidazole, 2-ethyl-4-methylimidazole, 2-phenylimidazole, 4-phenylimidazole, 1-cyanoethyl-2-phenylimidazole, and 1-(2-cyanoethyl)-2-ethyl-4-methylimidazole; dicyandiamide, amine compounds such as benzyldimethylamine, 4-(dimethylamino)-N,N-dimethylbenzylamine, 4-methoxy-N,N-dimethylbenzylamine, and 4-methyl-N,N-dimethylbenzylamine; hydrazine compounds such as adipic dihydrazide and sebacic dihydrazide; and phosphorus compounds such as triphenylphosphine. In addition, examples of commercially available heat-curing catalysts include 2MZ-A, 2MZ-OK, 2PHZ, 2P4BHZ, 2P4MHZ (all are trade names of imidazole-based compounds), which are manufactured by Shikoku Chemicals Corporation; and U-CAT 3513N (the trade name of a dimethyl amine-based compound), DBU, DBN, and U-CAT SA 102 (which are all bicyclic amidine compounds and salts thereof) which are manufactured by San-Apro Ltd. The catalyst is not limited particularly to these; and may be a heat-curing catalyst for an epoxy resin or an oxetane compound, or one that promotes a reaction of at least one of an epoxy group and an oxetanyl group with a carboxyl group. The catalysts may be used singly or in mixture of two or more kinds thereof.

Furthermore, guanamine, acetoguanamine, benzoguanamine, melamine, and S-triazine derivatives such as 2,4-diamino-6-methacryloyloxyethyl-S-triazine, 2-vinyl-2,4-diamino-S-triazine, a 2-vinyl-4,6-diamino-S-triazineisocyanuric acid adduct, and a 2,4-diamino-6-methacryloyloxyethyl-S-triazineisocyanuric acid adduct can be used. Preferably, these compounds which function also as adhesion imparting agents are used in combination with the heat-curing catalyst. The heat-curing catalysts may be used singly or in combination of two or more kinds thereof.

The content ratio of a heat-curing catalyst in the A agent can be set suitably in accordance with the viscosity of the A agent of interest. In cases where the A agent contains a heat-curing catalyst, the content ratio of the heat-curing catalyst is preferably more than 0 mass % and 20 mass % or less in the total amount of the A agent, more preferably 1 to 10 mass %, in terms of the solid concentration.

The content ratio of a heat-curing catalyst in the B agent can be set suitably in accordance with the viscosity of the B agent of interest. In cases where the B agent contains a heat-curing catalyst, the content ratio of the heat-curing catalyst is preferably more than 0 mass % and 20 mass % or less in the total amount of the B agent, more preferably 1 to 10 mass %, in terms of the solid concentration.

Furthermore, in cases where a two-component type curable resin composition contains a heat-curing catalyst, the content ratio of the heat-curing catalyst is preferably more than 0 mass % and 20 mass % or less in the total amount of the composition, more preferably 1 to 10 mass %, in terms of the solid concentration. A two-component type curable resin composition having a heat-curing catalyst at a content ratio of more than 0 mass % has excellent heat resistance. In addition, the content ratio of 20 mass % or less leads to enhancing the temporal stability.

[Colorant]

A two-component type curable resin composition according to the present invention can have a colorant blended therein. Examples of colorants that can be used include, but are not limited particularly to, known colorants such as red, blue, green, and yellow colorants. Any of a pigment, dye, and coloring matter may be used. A colorant containing no halogen is preferable from viewpoints of decreasing the environmental burden and having a smaller influence on a human body.

As the red color colorant, monoazo-based, disazo-based, azo lake-based, benzimidazolone-based, perylene-based, diketopyrrolopyrrole-based, condensed azo-based, anthraquinone-based, quinacridone-based red color colorant, and the like are available; and specific examples thereof include those given Colour Index International (C.I.; published by The Society of Dyers and Colourists) numbers as shown below.

Examples of the monoazo-based red color colorant include Pigment Red 1, 2, 3, 4, 5, 6, 8, 9, 12, 14, 15, 16, 17, 21, 22, 23, 31, 32, 112, 114, 146, 147, 151, 170, 184, 187, 188, 193, 210, 245, 253, 258, 266, 267, 268, and 269. Further, examples of the disazo-based red color colorant include Pigment Red 37, 38, and 41. Further, examples of the monoazo lake-based red color colorant include Pigment Red 48:1, 48:2, 48:3, 48:4, 49:1, 49:2, 50:1, 52:1, 52:2, 53:1, 53:2, 57:1, 58:4, 63:1, 63:2, 64:1, and 68. Further, examples of the benzimidazolone-based red color colorant include Pigment Red 171, 175, 176, 185, and 208. Further, examples of the perylene-based red color colorant include Solvent Red 135, 179, Pigment Red 123, 149, 166, 178, 179, 190, 194, and 224. Further, examples of the diketopyrrolopyrrole-based red color colorant include Pigment Red 254, 255, 264, 270, and 272. Further, examples of the condensed azo-based red color colorant include Pigment Red 220, 144, 166, 214, 220, 221, and 242. Further, examples of the anthraquinone-based red color colorant include Pigment Red 168, 177, and 216, Solvent Red 149, 150, 52, and 207. Further, examples of the quinacridone-based red color colorant include Pigment Red 122, 202, 206, 207, and 209.

As the blue color colorant, phthalocyanine-based and anthraquinone-based colorants are available. Examples of the pigment-based colorant include compounds classified as Pigment, for example, Pigment Blue 15, 15:1, 15:2, 15:3, 15:4, 15:6, 16, and 60. As the dye-based blue color colorant, Solvent Blue 35, 63, 68, 70, 83, 87, 94, 97, 122, 136, 67, 70, and the like can be used. Besides, metal-substituted or unsubstituted phthalocyanine compounds can be used as well.

As the yellow color colorant, monoazo-based, disazo-based, condensed azo-based, benzimidazolone-based, isoindolinone-based, anthraquinone-based yellow color colorants, and the like are available; and examples of the anthraquinone-based yellow color colorant include Solvent Yellow 163, Pigment Yellow 24, 108, 193, 147, 199, and 202. Examples of the isoindolinone-based yellow color colorant include Pigment Yellow 110, 109, 139, 179, and 185. Examples of the condensed azo-based yellow color colorant include Pigment Yellow 93, 94, 95, 128, 155, 166, and 180.

Examples of the benzimidazolone-based yellow color colorant include Pigment Yellow 120, 151, 154, 156, 175, and 181. Further, examples of the monoazo-based yellow color colorant include Pigment Yellow 1, 2, 3, 4, 5, 6, 9, 10, 12, 61, 62, 62:1, 65, 73, 74, 75, 97, 100, 104, 105, 111, 116, 167, 168, 169, 182, and 183. Further, examples of the disazo-based yellow color colorant include Pigment Yellow 12, 13, 14, 16, 17, 55, 63, 81, 83, 87, 126, 127, 152, 170, 172, 174, 176, 188, and 198.

Besides, a colorant of violet, orange, brown, black, or the like may be added. Specific examples thereof include Pigment Black 1, 6, 7, 8, 9, 10, 11, 12, 13, 18, 20, 25, 26, 28, 29, 30, 31, and 32; Pigment Violet 19, 23, 29, 32, 36, 38, and 42; Solvent Violet 13 and 36; C.I. Pigment Orange 1, 5, 13, 14, 16, 17, 24, 34, 36, 38, 40, 43, 46, 49, 51, 61, 63, 64, 71, and 73; Pigment Brown 23 and 25; and carbon black.

The content ratio of a colorant in the A agent can be set suitably in accordance with the viscosity of the A agent of interest. In cases where the A agent contains a colorant, the content ratio of the colorant is preferably more than 0 mass % and 10 mass % or less in the total amount of the A agent, more preferably 0.2 to 5 mass %, in terms of the solid concentration.

The content ratio of a colorant in the B agent can be set suitably in accordance with the viscosity of the B agent of interest. In cases where the B agent contains a colorant, the content ratio of the colorant is preferably more than 0 mass % and 10 mass % or less in the total amount of the B agent in terms of the solid concentration.

Furthermore, in cases where a two-component type curable resin composition contains a colorant, the content ratio of the colorant is preferably more than 0 mass % and 10 mass % or less in the total amount of the composition, more preferably 0.2 to 5 mass %, in terms of the solid concentration.

[Extender Pigment]

A two-component type curable resin composition according to the present invention can have an extender pigment blended therein. Examples of extender pigments include: barium sulfate; barium titanate; silica such as amorphous silica, crystalline silica, fused silica, and spherical silica; talc; clay; Neuburger silica particles; boehmite; magnesium carbonate; calcium carbonate; titanium oxide; aluminum oxide; aluminum hydroxide; silicon nitride; aluminum nitride; calcium zirconate; and the like. The extender pigments may be used singly or in combination of two or more kinds thereof. Containing an extender pigment makes it possible to enhance the heat resistance, and decrease the unevenness during coating.

The content ratio of an extender pigment in the A agent can be set suitably in accordance with the viscosity of the A agent of interest. In cases where the A agent contains an extender pigment, the content ratio of the extender pigment is preferably 10 to 60 mass % in the total amount of the A agent, more preferably 20 to 50 mass %, in terms of the solid concentration.

The content ratio of an extender pigment in the B agent can be set suitably in accordance with the viscosity of the B agent of interest. In cases where the B agent contains an extender pigment, the content ratio of the extender pigment is preferably 0 mass % or more and 70 mass % or less in the total amount of the B agent in terms of the solid concentration.

Furthermore, in cases where the two-component type curable resin composition contains an extender pigment, the content ratio of the extender pigment is preferably 5 to 70 mass % in the total amount of the composition, more preferably 10 to 50 mass %, in terms of the solid concentration.

[Organic Solvent]

A two-component type curable resin composition according to the present invention can contain an organic solvent for the purposes of preparing the composition, adjusting the viscosity during the course of coating a substrate or a film, and the like. Examples of organic solvents that can be used include known common organic solvents such as the following: ketones such as methyl ethyl ketone and cyclohexanone; aromatic hydrocarbons such as toluene, xylene, and tetramethylbenzene; glycol ethers such as cellosolve, methyl cellosolve, butyl cellosolve, carbitol, methyl carbitol, butyl carbitol, propylene glycol monomethyl ether, dipropylene glycol monomethyl ether, dipropylene glycol diethyl ether, diethylene glycol monomethyl ether acetate, and tripropylene glycol monomethyl ether; esters such as ethyl acetate, butyl acetate, butyl lactate, cellosolve acetate, butyl cellosolve acetate, carbitol acetate, butyl carbitol acetate, propylene glycol monomethyl ether acetate, dipropylene glycol monomethyl ether acetate, and propylene carbonate; aliphatic hydrocarbons such as octane and decane; petroleum solvents such as petroleum ether, petroleum naphtha, and solvent naphtha; and the like. These organic solvents may be used singly or in combination of two or more kinds thereof.

The content ratio of an organic solvent in the A agent can be set suitably in accordance with the viscosity of the A agent of interest. In cases where the A agent contains an organic solvent, the content ratio of the organic solvent is preferably 10 to 50 mass % in the total amount of the A agent, more preferably 20 to 40 mass %.

The content ratio of an organic solvent in the B agent can be set suitably in accordance with the viscosity of the B agent of interest. In cases where the B agent contains an organic solvent, the content ratio of the organic solvent is preferably 1 to 60 mass % in the total amount of the B agent, more preferably 5 to 50 mass %.

Furthermore, in cases where the two-component type curable resin composition contains an organic solvent, the content ratio of the organic solvent is preferably 10 to 50 mass % in the total amount of the composition, more preferably 20 to 40 mass %.

[Other Additive Ingredients]

If desired, a two-component type curable resin composition according to the present invention can further have another ingredient(s) blended therein. Examples of such ingredients include; photoinitiation auxiliary agents; cyanate compounds; elastomers; mercapto compounds; urethanation catalysts; thixotropicizing agents; adhesion promoters; block copolymers; chain transfer agents; polymerization inhibitors; copper inhibitors; antioxidants; anti-rust agents; thickeners such as fine powder silica, organic bentonite, and montmorillonite; silicone-based, fluorine-based, polymer-based, and other antifoaming agents and/or leveling agents; imidazole-based, thiazole-based, triazole-based, and other silane coupling agents; phosphinates; phosphate ester derivatives; and flame retardants such as phosphorus compounds such as phosphazene compounds. As these materials, products known in the field of electronic materials can be used.

[Method of Preparation]

To prepare the A agent and the B agent, the ingredients are weighed out, blended, and then stirred preliminarily using a stirrer. Subsequently, the ingredients are dispersed and kneaded in a kneader, so that the ingredients can be prepared.

Examples of such kneaders include bead mills, ball mills, sand mills, triple roll mills, double roll mills, and the like. Among these, a bead mill is preferably used from a viewpoint of enhancing the dispersibility. For example, using a bead mill to prepare an A agent and using a triple roll mill to prepare a B agent makes it easier to adjust the viscosity of each of the A agent and the B agent and a difference in viscosity therebetween within a desired range. The type of the beads for a bead mill and the dispersion conditions such as a rotational speed can be set suitably in accordance with the viscosity of interest. The dispersion conditions such as the rotational speed ratios for the rolls of a triple roll mill can be set suitably in accordance with the viscosity of interest.

[Applications]

A two-component type curable resin composition according to the present invention is useful for forming a pattern layer as a permanent coating on a printed wiring board, such as a solder resist, a cover lay, or an interlayer insulation layer, and is useful particularly for forming a solder resist. In addition, a two-component type curable resin composition according to the present invention, even if in the form of a thin film, can form a cured product having excellent membrane strength, and thus, can be suitably used for forming a pattern layer on a printed wiring board that involves becoming thinner, for example, a package substrate (a printed wiring board to be used for a semiconductor package). Furthermore, a cured product obtained from a two-component type curable resin composition according to the present invention can be used suitably for a flexible printed wiring board.

In addition, a two-component type curable resin composition according to the present invention can be used not only for applications that involve forming a pattern layer of a cured film, but also for applications that do not involve forming a pattern layer, for example, molding applications (sealing applications).

[Dry Film]

A two-component type curable resin composition according to the present invention can be used in the form of a dry film including: a first film; and a resin layer composed of a dried coating of the two-component type curable resin composition and formed on this first film. To form a dry film, an A agent and a B agent for a two-component type curable resin composition according to the present invention are mixed at a predetermined ratio, stirred, and, if desired, diluted with the above-mentioned organic solvent so as to have a suitably adjusted viscosity. The resulting mixture is applied to a first film to have a uniform thickness, using a comma coater, blade coater, LIP coater, rod coater, squeeze coater, reverse coater, transfer roll coater, gravure coater, spray coater, or the like, and dried usually at a temperature of 50 to 130° C. for 1 to 30 minutes. A film can be thus obtained. The thickness of the coating film is subject to no particular limitation; and is generally selected as appropriate in the range of from 1 to 150 μm, preferably 10 to 60 μm, as the thickness obtained after the drying.

As such a first film, any known such film can be used without particular limitation. For example, films composed of thermoplastic resins such as polyester films of polyethylene terephthalate, polyethylene naphthalate, or the like, polyimide films, polyamide-imide films, polypropylene films, or polystyrene films can be suitably used. Of these, polyester films are preferable from viewpoints of heat resistance, mechanical strength, ease of handling, and the like. In addition, a laminate of these films can be used as the first film.

Additionally, from a viewpoint of enhancing the mechanical strength, the above-mentioned thermoplastic resin film is preferably a film stretched in the uniaxial direction or the biaxial direction.

The thickness of the first film can be, for example, but not limited particularly to, 10 μm to 150 μm.

After the resin layer composed of a dried coating of a two-component type curable resin composition according to the present invention is formed on the first film, a peelable second film is preferably further laminated on the surface of the resin layer (the opposite face from the face in contact with the first film), for example, for the purpose of preventing dust from sticking to the surface of the resin layer. Examples of such peelable second films that can be used include polyethylene films, polytetrafluoroethylene films, polypropylene films, surface-treated paper, and the like. The adhesive force between the resin layer and the second film has only to be smaller than the adhesive force between the resin layer and the first film when the second film is peeled off.

The thickness of the second film can be, for example, but not limited particularly to, 10 μm to 150 μm.

To produce a cured coating on a printed wiring board using a dry film, a second film is peeled from the dry film, a resin layer uncovered on the dry film is superposed on a base material having a circuit formed thereon, and the resin layer and the base material are attached to each other using a laminater or the like so that the resin layer can be formed on the base material having a circuit formed thereon. Then, subjecting the resin layer formed to exposure, development, and heat-curing makes it possible to form a cured coating. The first film has only to be peeled off either before exposure or after exposure.

[Cured Product]

A cured product according to the present invention is obtained by curing a two-component type curable resin composition according to the present invention or the resin layer of a dry film according to the present invention. A cured product according to the present invention can be suitably used for a printed wiring board, an electronic part, or the like. A cured product according to the present invention has excellent bendability, and thus, can be suitably used for a flexible printed wiring board in particular. In addition, a cured product according to the present invention has excellent infrared blocking properties and temporal stability.

[Printed Wiring Board]

A printed wiring board according to the present invention has a cured product obtained from a two-component type curable resin composition according to the present invention or the resin layer of a dry film according to the present invention. In an example of a method of producing a printed wiring board according to the present invention, the viscosity of a two-component type curable resin composition according to the present invention is adjusted with the above-mentioned organic solvent so as to be suitable for a coating method. The composition is applied to a base material using a method such as a dip coating method, flow coating method, roll coating method, bar coater method, screen printing method, or curtain coating method, and then dried (temporarily dried) at a temperature of 60 to 100° C. to volatilize the organic solvent contained in the composition. A tack-free resin layer is thus formed. Additionally, in cases where a dry film is used, a resin layer is attached to a base material so as to be in contact with the base material using a laminater or the like, and then, the first film is peeled off to form the resin layer on the base material.

Examples of base materials include: printed wiring boards having a circuit preliminarily formed with copper and flexible printed wiring boards; besides, all grades (FR-4 and the like) of copper clad laminates that use materials of copper clad laminates for high frequency circuit using paper phenol, paper epoxy, glass cloth epoxy, glass polyimide, glass cloth/non-woven fabric epoxy, glass cloth/paper epoxy, synthetic fiber epoxy, fluorine resin-polyethylene-polyphenylene ether, polyphenylene oxide-cyanate, or the like; and in addition, metal boards, polyimide films, polyethylene terephthalate films, polyethylene naphthalate (PEN) films, glass boards, ceramic boards, and wafer boards.

The dry film is preferably attached to the base material using a vacuum laminater or the like under pressure and heating. In cases where a board having a circuit formed thereon is used, and even in cases where the circuit board has roughness on the surface thereof, using such a vacuum laminater allows the dry film to be closely attached to the circuit board, thus eliminates inleakage of air bubbles, and enables the dents of the board surface to be filled up better. The applied pressure condition is preferably about 0.1 to 2.0 MPa; and the heating condition is preferably 40 to 120° C.

After the two-component type curable resin composition according to the present invention is applied, the volatilization and drying can be performed using a hot air circulation drying furnace, an IR furnace, a hot plate, a convection oven, or the like (a method comprising countercurrent-contacting of a heated air in a dryer using one that includes a heat source in the mode of heating air by steam, and a method comprising spraying a support from a nozzle).

The resin layer formed on the base material is selectively exposed to active energy rays applied through a photomask having a predetermined pattern formed therein, and the unexposed portions are developed with an aqueous dilute alkali solution (for example, an aqueous solution of 0.3 to 3 mass % sodium carbonate) to form the pattern of the cured product. In cases where a dry film is used, the first film is peeled from the dry film after the exposure, and then the resulting film is developed to form a patterned cured product on the base material. In this regard, to the extent that the characteristics are not impaired, it is possible that the first film is peeled from the dry film before exposure, and then, the resin layer uncovered undergoes exposure and development.

Furthermore, the cured product is irradiated with active energy rays, and then heat-cured (for example, at 100 to 220° C.), or alternatively heat-cured and then irradiated with active energy rays, or only heat-cured to undergo the final-finish curing (the principal curing), to form a cured film having excellent characteristics such as adhesion and hardness.

An exposure apparatus used for the active energy ray irradiation only need to be an apparatus that includes a high pressure mercury vapor lamp, an ultrahigh pressure mercury vapor lamp, a metal halide lamp, a mercury short arc lamp, or the like, and radiates an ultraviolet ray of 350 to 450 nm. Further, a direct patterning apparatus (for example, a laser direct imaging apparatus that directly draws picture images using a laser based on CAD data from a computer) can also be used. The lamp light source or laser light source of the direct patterning equipment has only to have the maximum wavelength in the range of from 350 to 450 nm. The exposure amount for the picture image formation varies depending on the film thickness and the like, and can generally be set to the range of from 10 to 1000 mJ/cm$^2$, preferably from 20 to 800 mJ/cm$^2$.

Examples of the development method include a dipping method, shower method, spray method, and brush method. Examples of developing solutions that can be used include aqueous solutions of alkali such as potassium hydroxide, sodium hydroxide, sodium carbonate, potassium carbonate, sodium phosphate, sodium silicate, ammonia, or amine.

EXAMPLES

Below, the present invention will be described in detail with reference to Examples. However, the present invention is by no means limited to the below-mentioned Examples. Hereinafter, the expressions "part(s)" and "%" are all on a mass basis, unless otherwise specified.

(Synthesis of Carboxyl Group-Containing Resin Varnish 1)

Into a four-necked flask with a stirrer and a reflux condenser, 220 parts of cresol novolak-type epoxy resin (EPICLON N-695, manufactured by DIC Corporation; the epoxy equivalent, 220) was added, and 214 parts of carbitol acetate was added and dissolved under heating. Next, 0.1 part of hydroquinone as a polymerization inhibitor and 2.0 parts of dimethyl benzyl amine as a reaction catalyst were added. This mixture was heated to 95 to 105° C., and to the mixture, 72 parts of acrylic acid was gradually added dropwise. The resulting mixture was allowed to react for 16 hours. This reaction product was cooled to 80 to 90° C., 106 parts of tetrahydrophthalic anhydride was added to the product, and the resulting mixture was allowed to react for 8 hours, cooled, and then taken out.

In this manner, a carboxyl group-containing resin varnish 1 having a solid acid value of 100 mgKOH/g, a solid concentration of 65%, and a weight average molecular weight Mw of approximately 3,500 was obtained.

(Preparation of A Agent and B Agent)

For the A agent compositions, the ingredients were blended in accordance with the formulation mentioned in the below-mentioned Table 1, and stirred using a stirrer. Subsequently, the composition of the formulation example 1 was prepared through dispersion and kneading using a bead mill. Subsequently, the compositions of the formulation examples 2, 3, and 6 were prepared through dispersion and kneading using a triple roll mill.

Additionally, for the B agent compositions, the ingredients were blended in accordance with the formulation mentioned in the below-mentioned in Table 2, and stirred using a stirrer. Then, the compositions of the formulation examples 4, 5, and 7 were stirred for 10 minutes using the agitating blades of a drilling machine (at a rotational speed of 500 rpm). In addition, the composition of the formulation example 6 was kneaded through dispersion using a triple roll mill.

The above-mentioned dispersion with a bead mill was performed under the following conditions. Each composition was treated for dispersion at an agitator rotational speed of 1,000 rpm using a horizontal wet mill (manufactured by Buhler Group) with 1.0 mm zirconia beads at a beads filling rate of 85%.

In the dispersion with a roll mill, each composition was treated for dispersion using a triple roll mill manufactured by Inoue Mfg., Inc. with the three rolls at a rotational speed ratio 1:3:9 respectively and at a roll rotational speed of 360 rpm.

TABLE 1

| A agent formulation example | 1 | 2 | 3 |
|---|---|---|---|
| Carboxyl group-containing resin*[1] | 100 | 100 | 100 |
| Photopolymerizable monomer*[2] | 20 | 20 | 20 |
| Photoinitiator*[3] | 10 | 10 | 10 |
| Sensitizer*[4] | 0.5 | 0.5 | 0.5 |
| Heat-curing catalyst*[5] | 1 | 1 | 1 |
| Extender pigment*[6] | 80 | 80 | 80 |
| Colorant*[7] | 1.2 | 1.2 | 1.2 |
| Solvent*[8] | 76 | 64 | 64 |
| Diluent*[9] | 0 | 0 | 12 |
| Total | 288.7 | 276.7 | 288.7 |
| Dispersing method | bead mill | roll mill | roll mill |
| Viscosity (dPa · s) | 82 | 298 | 42 |
| Dispersion | 15 | 25 | 25 |

The blending amounts in Table 1 are expressed in part(s) by mass.
The details of each ingredient in Table 1 are as below-mentioned.
*[1]the carboxyl group-containing resin varnish 1 synthesized as above-mentioned. The blending amount is a value in terms of the solid concentration.
*[2]dipentaerythritol hexaacrylate (DPHA, manufactured by Nippon Kayaku Co., Ltd.)
*[3]2-[4-(methylthio)benzoyl]-2-(4-morpholinyl)propane (Omnirad 907, manufactured by IGM Resins B.V.)
*[4]2,4-diethylthioxanthone (KAYACURE DETX-S, manufactured by Nippon Kayaku Co., Ltd.)
*[5]dicyandiamide
*[6]barium sulfate (B-30, manufactured by Sakai Chemical Industry Co., Ltd.)
*[7]red colorant (Paliogen Red K3580, manufactured by BASF Japan Ltd.)
*[8]diethylene glycol monoethyl ether acetate
*[9]dipropylene glycol methyl ether

TABLE 2

| B agent formulation example | 4 | 5 | 6 | 7 |
|---|---|---|---|---|
| Thermosetting ingredient (solid)*[10] | 36 | 24 | 36 | 36 |
| Thermosetting ingredient (liquid)*[11] | 0 | 12 | 0 | 0 |
| Extender pigment*[12] | 0 | 0 | 60 | 0 |
| Solvent*[13] | 18 | 8 | 25 | 24 |
| Total | 54 | 44 | 121 | 60 |
| Dispersing method | stirring | stirring | roll mill | stirring |
| Viscosity (dPa · s) | 280 | 224 | 180 | 40 |
| Dispersion | 0 | 0 | 30 | 0 |

The blending amounts in Table 2 are expressed in part(s) by mass.
The details of each ingredient in Table 2 are as below-mentioned.
*[10]cresol novolak-type epoxy resin (EOC N-1020, manufactured by Nippon Kayaku Co., Ltd.)
*[11]bisphenol A-type epoxy resin (EPICLON 850-S, manufactured by DIC Corporation)
*[12]barium sulfate (B-30, manufactured by Sakai Chemical Industry Co., Ltd.)
*[13]diethylene glycol monoethyl ether acetate Examples 1 and 2 and Comparative Examples 1 to 4

(Preparation of Two-Component Type Curable Resin Composition)

If desired, the A agent and B agent prepared as above-mentioned were diluted with an organic solvent (carbitol acetate) so as to have a viscosity value mentioned in Table 3. Subsequently, the A agent and B agent having an adjusted viscosity were mixed at the mixing ratio (by mass) mentioned in Table 3, and stirred to yield a two-component type curable resin composition in each of Examples 1 and 2 and Comparative Examples 1 to 4. The resulting two-component type curable resin compositions were evaluated as below-mentioned. The results are tabulated in Table 3 below. In this regard, the method for stirring the A agent and the B agent was manual stirring (5 minutes).

(Viscosity)

The A agents and the B agents prepared as above-mentioned and the two-component type curable resin compositions in Examples and Comparative Examples were each sampled in an amount of 0.2 ml, and used to measure the viscosity value using a cone-plate type viscometer (TV-33H, manufactured by Toki Sangyo Co., Ltd.) at 25° C. at a rotational speed of 5 rpm (a shear speed of $10^{-1}$ s) for 30 seconds. The measurement results are tabulated in Table 3. The steps other than as above-mentioned were performed in accordance with the "Viscosity measurement method using a cone-plate rotational viscometer" in JIS-Z8803: 2011, Part 10.

(Dispersibility)

The above-mentioned resulting two-component type curable resin compositions (which were each a mixture of the A agent and the B agent that were adjusted) obtained in Examples 1 and 2 and Comparative Examples 1 to 4 were used to measure the dispersity by a particle form method in accordance with JIS K 5600-2-5:1999 using a grind gauge having a width of 90 mm, a length of 240 mm, and the largest depth of 50 μm. Specifically, a point where each mixture used for measurement first showed a predominantly speckled (speck-like) appearance was observed. In particular, a point containing 5 to 10 particles in a 3-mm-wide band across a groove was observed. Specks that appeared scatteredly before the point where the predominantly speckled appearance was first shown were disregarded. The measurement results are tabulated in Table 3.

(Printability)

The above-mentioned resulting two-component type curable resin compositions (which were each a mixture of the A agent and the B agent that were adjusted) obtained in Examples 1 and 2 and Comparative Examples 1 to 4 were solid-printed by screen printing, using a 180-mesh polyester plate (with bias), so as to have a cured film thickness of 12 μm on a 300 mm×150 mm copper foil substrate the surface of which was buff-roll-polished and which had a thickness of 35 μm. The printing quality of the resulting composition was evaluated on the below-mentioned criterion. The evaluation results are tabulated in Table 3.

○: the substrate printed was favorable in terms of both peel-off and the slump of the ink printed on the substrate.
  x: the substrate printed was poor in terms of either peel-off or the slump of the ink printed on the substrate.

(Verification of Visible-Copper Phenomenon)

The two-component type curable resin compositions (which were each a mixture of the A agent and the B agent that were adjusted) obtained in Examples 1 and 2 and Comparative Examples 1 to 4 were solid-printed by screen printing, using a 180-mesh polyester plate (with bias), so as to have a cured film thickness of 12 μm on a 300 mm×150 mm copper foil substrate the surface of which was buff-roll-polished and which had a thickness of 35 μm. The resulting composition was cured at 150° C. for 60 minutes using a hot air circulation drying furnace (DF610, manufactured by Yamato Scientific Co., Ltd.), and left to stand and cool at room temperature under a yellow lamp for 30 minutes to produce a substrate for evaluation. Each substrate produced for evaluation was left to stand in an environment at 25° C. and 50% RH for 1 minute in a state where a waste impregnated isopropyl alcohol (IPA) was placed on the surface of the cured coating, and where a 500-g weight was further placed on the waste. Then, the waste was peeled off, and a verification was conducted on whether the whole or part of the resin layer did not stick to that face of the waste which was in contact with the cured coating.

Then, observations were made for parts where copper on the underlying material was visible in a 70 mm×70 mm range under an optical microscope (at a magnification of 50×). The evaluation results are tabulated in Table 3.

○: there was no part where copper was visible.
  x: there was/were a part(s) where copper was visible.

(Packability)

The present evaluation was performed to evaluate the packing form (receivability) for transportation. The amount of each of the A agent and the B agent in each of Examples and Comparative Examples was checked to verify that the total amount of the A agent and the B agent was 1,000 g. An optimal container in which each agent could be packed in the amount was selected, and 10 containers were received in a corrugated box 280 mm×360 mm×300 mm. Such receivability was evaluated as packability. The evaluation was performed on the following criterion. The evaluation results are tabulated in Table 3.

○: the receiving was possible with some room left.
  x: the receiving was possible with no room left, or was not possible for at least one of the A agent and the B agent.

In this regard, the containers in Table 3 represent the following containers.

Bag: a pouch (material, aluminum (body (external appearance)); the internal capacity, approximately 300 mL)
  Plastic container: a black polymer-made container; A agent container, BHS-1200, black (manufactured by Kinki Yoki Co., Ltd.; the material, HDPE (body); the internal capacity, approximately 1,200 mL) and B agent container, BHS-300, black (manufactured by Kinki Yoki Co., Ltd.; the material, HDPE (body); the internal capacity, approximately 310 mL).

TABLE 3

|  | Example | | Comparative Example | | | |
| --- | --- | --- | --- | --- | --- | --- |
|  | 1 | 2 | 1 | 2 | 3 | 4 |
| A agent (formulation example) | 1 | 1 | 1 | 2 | 3 | 1 |
| B agent (formulation example) | 4 | 5 | 6 | 4 | 4 | 7 |
| A agent viscosity (dPa · s) | 82 | 82 | 82 | 298 | 42 | 82 |
| B agent viscosity (dPa · s) | 280 | 224 | 180 | 280 | 280 | 40 |
| Viscosity after mixing (dPa · s) | 79 | 88 | 72 | 222 | 39 | 32 |
| Mixing ratio (B agent ratio (%)) | 20 | 13 | 30 | 20 | 16 | 17 |

TABLE 3-continued

| | Example | | Comparative Example | | | |
|---|---|---|---|---|---|---|
| | 1 | 2 | 1 | 2 | 3 | 4 |
| Dispersity after mixing | 15 | 15 | 30 | 25 | 25 | 15 |
| B agent viscosity − A agent viscosity | 198 | 142 | 98 | −18 | 238 | −42 |
| A agent container | plastic container | plastic container | plastic container | plastic container | plastic container | plastic container |
| B agent container | bag | bag | plastic container | bag | bag | bag |
| Printability | ○ | ○ | ○ | x | x | x |
| Verification of visible-copper phenomenon | ○ | ○ | x | x | x | ○ |
| Packability | ○ | ○ | x | ○ | ○ | ○ |

As is clear from Table 3, each of the two-component type curable resin compositions in Examples, as a mixture of the A agent and the B agent, has excellent dispersibility and printability, causes no visible-copper phenomenon, and has an excellent packing form (receivability) for transportation.

The invention claimed is:

1. A two-component type curable resin composition_, comprising:
   an A agent; and
   a B agent;
   wherein:
   the A agent comprises a carboxyl group-containing resin and an extender pigment;
   the B agent comprises a thermosetting ingredient;
   the A agent has a viscosity value of 50 dPa·s or more and 200 dPa·s or less at 25° C. at 5 rpm;
   the B agent has a viscosity value of 100 dPa·s or more and 300 dPa·s or less at 25° C. at 5 rpm;
   a dispersity of a mixture of the A agent and the B agent is 20 μm or less on a grind gauge; and
   with respect to the total amount of the A agent and the B agent, an amount of the A agent is 75 mass % or more and less than 100 mass %, and an amount of the B agent is more than 0 mass % and 25 mass % or less.

2. The two-component type curable resin composition according to claim 1, wherein a viscosity value of a mixture of the A agent and the B agent is 30 dPa·s or more and 200 dPa·s or less at 25° C. at 5 rpm.

3. The two-component type curable resin composition according to claim 1, wherein:
   the B agent has a higher viscosity than the A agent; and
   a difference between the viscosity value of the A agent at 25° C. at 5 rpm and the viscosity value of the B agent at 25° C. at 5 rpm is more than 0 dPa·s and 250 dPa·s or less.

4. The two-component type curable resin composition according to claim 2, wherein:
   the B agent has a higher viscosity than the A agent; and
   a difference between the viscosity value of the A agent at 25° C. at 5 rpm and the viscosity value of the B agent at 25° C. at 5 rpm is more than 0 dPa·s and 250 dPa·s or less.

5. The two-component type curable resin composition according to claim 1, wherein the thermosetting ingredient comprises a polyfunctional epoxy compound.

6. The two-component type curable resin composition according to claim 2, wherein the thermosetting ingredient comprises a polyfunctional epoxy compound.

7. The two-component type curable resin composition according to claim 3, wherein the thermosetting ingredient comprises a polyfunctional epoxy compound.

8. The two-component type curable resin composition according to claim 4, wherein the thermosetting ingredient comprises a polyfunctional epoxy compound.

9. A product comprising the two-component type curable resin composition according to claim 1, wherein:
   the A agent and the B agent are packed in separate containers; and
   at least one of the A agent and the B agent is packed in a bag.

10. A dry film comprising:
    a first film; and
    a resin layer formed on the first film;
    wherein resin layer comprises a dried coating of the two-component type curable resin composition according to claim 1.

11. A cured product obtained by curing the two-component type curable resin composition according to claim 1.

12. A cured product obtained by curing the resin layer of the dry film according to claim 10.

13. A printed wiring board comprising the cured product according to claim 11.

14. A printed wiring board comprising the cured product according to claim 12.

15. The two-component type curable resin composition according to claim 1, wherein the A agent comprises the extender pigment in an amount of 10 to 60 mass % based on a total solid content of the A agent.

16. The two-component type curable resin composition according to claim 1, wherein the A agent further comprises a photopolymerizable monomer.

17. The two-component type curable resin composition according to claim 16, wherein the A agent comprises the photopolymerizable monomer in an amount of more than 0 to 30 mass % based on a total solid content of the A agent.

* * * * *